United States Patent
Kutner

(10) Patent No.: US 6,467,097 B1
(45) Date of Patent: Oct. 22, 2002

(54) GOLF TRAINING DEVICE

(76) Inventor: Daryl Kutner, 801 SW. 3 Ave. #301, Miami, FL (US) 33130

( * ) Notice: Subject to any disclaimer, the term of this patent is extended or adjusted under 35 U.S.C. 154(b) by 0 days.

(21) Appl. No.: 09/770,623

(22) Filed: Jan. 26, 2001

(51) Int. Cl.⁷ ............................................. A42B 1/24
(52) U.S. Cl. ................. 2/209.13; 2/195.1; 434/252; 473/208
(58) Field of Search ............................... 2/171, 209.13, 2/175.1, 195.1, 195.2–5, 159, 160, 161.1–161.4, 162, 163; 434/252; 473/205, 208

(56) References Cited

U.S. PATENT DOCUMENTS

| | | | |
|---|---|---|---|
| 3,142,833 A | | 7/1964 | Bosley et al. |
| 3,435,556 A | | 4/1969 | Clarke |
| 4,502,035 A | * | 2/1985 | Obenauf et al. ............ 340/323 |
| 4,525,878 A | | 7/1985 | Lowe, Jr. |
| 4,560,166 A | * | 12/1985 | Emerson ..................... 273/183 |
| 4,869,509 A | * | 9/1989 | Lee ............................ 273/183 |
| 4,896,375 A | | 1/1990 | Colucci |
| 5,199,712 A | * | 4/1993 | Hoyle, Jr. et al. ....... 273/187.2 |
| 5,510,961 A | | 4/1996 | Peng |
| 5,733,201 A | * | 3/1998 | Caldwell et al. ............ 473/202 |
| 5,771,492 A | * | 6/1998 | Cozza .......................... 2/161.2 |
| 5,802,183 A | | 9/1998 | Scheller et al. |
| 5,871,406 A | * | 2/1999 | Worrell ........................ 473/221 |
| 6,248,023 B1 | * | 6/2001 | Fish ............................. 473/209 |
| 6,254,492 B1 | * | 7/2001 | Taggett ........................ 473/219 |

* cited by examiner

Primary Examiner—Peter Nerbun
Assistant Examiner—Katherine Moran
(74) Attorney, Agent, or Firm—Malloy & Malloy, P.A.

(57) ABSTRACT

A golf training device including a clothing article structured to be worn by a user, an input assembly responsive to a user and structured to provide a user with at least two response options that may be elected by the user, and an output assembly disposed in association with the clothing article. The response options provided by the input assembly are associated with different aspects of an activity, thereby allowing a user to select the response option that best corresponds the aspect of the activity for which training is presently required. Furthermore, the output assembly is structured to communicate to the user instructional information that corresponds the aspect of the activity associated with a selected one of the response options, the instructional information being in the form of an audio message that is spoken by a recognizable personality.

15 Claims, 1 Drawing Sheet

GOLF TRAINING DEVICE

BACKGROUND OF THE INVENTION

1. Field of the Invention

The present invention relates to an activity training device, and preferably a golf training device structured to be utilized by a user actually participating in the activity so as to provide them beneficial instruction, motivation, etc., in order to assist with their performance of the activity. The present activity training device is structured to be non-obtrusive and effectively, yet preferably inconspicuously used while performing the activity so as to provide the user with continuous reinforcement of beneficial techniques and information regarding preferable strategies and procedures, depending upon the specific aspect of the activity being performed.

2. Description of the Related Art

There are many activities which are performed every day by individuals which require substantial amounts of training in order to perfect. One such activity is the play of the game of golf wherein the variety of different aspects of the game make the game difficult for an individual to master without extensive amounts of training. To this end, in some activities, and especially in association with the game of golf, a variety of different training aids and devices have been provided so as to help individuals master the activity over periods of time. These training aids include physically constraining or guiding devices which attempt to physically guide a person's movement, such as their swing, body position, etc., as well as instructional tools such as books and videos which attempt to illustrate to a user the proper procedure in performing the activity and/or a certain aspects thereof.

One primary drawback associated with currently existing training devices, however, relates to their limited ability to actually assist the user in the training while they are participating in the activity. For example, physical training devices, wherein specialized equipment physically constrains or aides the user can be obtrusive or unacceptable for normal play, and indeed, sometimes leave the user worse off if they become dependent and cannot use the device in the future. Moreover, individuals do not generally like to utilize such visible or obtrusive training devices in public venues where they may be observed by a variety of individuals and wherein drastic measures are taken by the training device. Accordingly, such devices generally cause individuals to train on their own, during practice time, and hopefully the pointers are picked up sufficiently during the training and can carry over to when the activity is performed in the future. As a matter fact, it is for this reason that videos and other illustrative training devices are so popular. Specifically, individuals often utilize videos, books, etc. so as to provide them with some insight and/or indication as to what they will or should do when they actually go out and perform the activity. Still, however, such devices often do not provide sufficient reinforcement of the techniques so as to extend their effectiveness to actual performance of the activity.

From the preceding, it is recognized, that the most effective means of actually training for an activity required the hiring of a trainer who can observe the performance of the activity and give pointers as needed. These pointers may be repetitive in nature, however, they are effective to remind and/or guide the player of appropriate techniques. Of course, the hiring of such a trainer can become rather expensive and may not be possible at all times.

For these reasons, it would be highly beneficial to provide an activity training device, and especially a training device for use in playing the game of golf, which provide constructive assistance to the individual user, while they are actually performing the activity, in an effective manner that is minimally obtrusive and will not compromise future performance of the activity by actually acting as a crutch to physical performance. Further, such a device should be conveniently available at all times for use by the individual, thereby providing them with as much or as little training as they require.

SUMMARY OF THE INVENTION

The present invention relates to an activity training device, such as a golf training device. The training device in particular includes a clothing article, such as a hat, visor or other article of head gear, that is to be worn by a user. Moreover, the training device includes an input assembly that is disposed in association with the clothing article, and is responsive to a user.

The input device is preferably structured to provide a user with at least two response options that may be effectively selected by user. For example, the response options are preferably provided in association with different aspects of the activity being performed and for which the training is required. As such, the input assembly is responsive to selections by a user to a corresponding and/or desired one of the response options which best correspond an aspect of the activity that is currently being performed.

The training device further includes an output assembly. The output assembly is also disposed in association with the clothing article, but is positioned in a manner so as to effectively communicate information to the user. Specifically, the output assembly is structured to communicate instructional information to the user, that instructional information corresponding to the aspect of the activity that is associated with the selected one of the response options. In this manner, if a user is undertaking a specific aspect of the activity and desires assistance, they may correspondingly select one of the response options and receive appropriate instructional information from the output assembly to aide in the training process.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
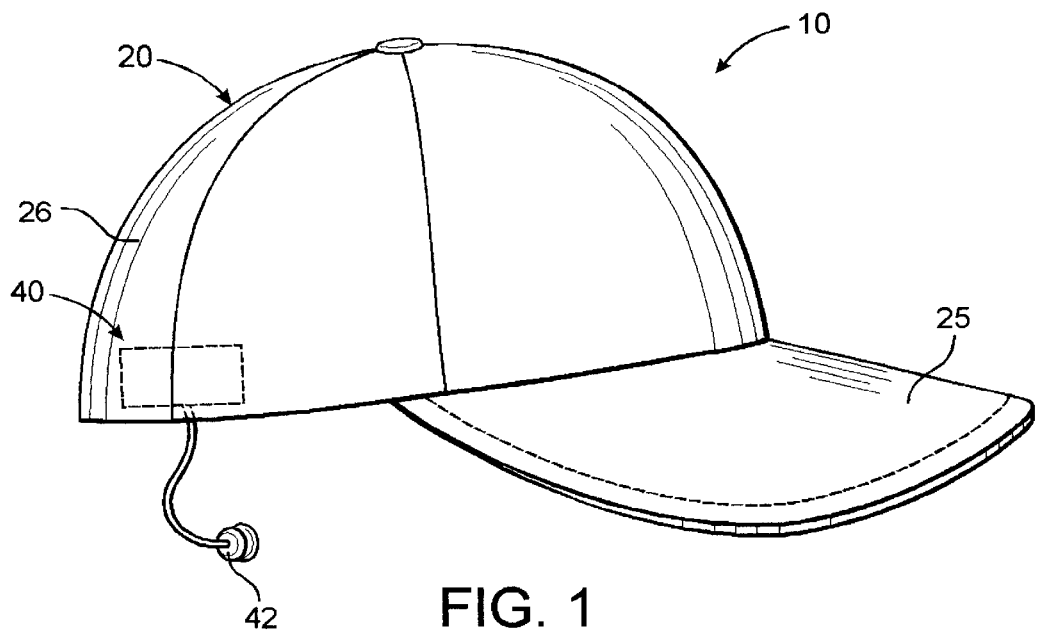
FIG. 1 is a perspective illustration of one embodiment of the activity training device of the present invention.

Shown throughout the Figures, the present invention is directed towards an activity training device, generally indicated as 10. Specifically, the activity training device 10 is structured for use in training a variety of activities, such as sporting activities including golf, baseball, hockey, etc., as well as other activities including work related tasks. In order to facilitate use while performing the activity, the activity training device 10 preferably includes a clothing article 20 that is structured to be worn by a user. This clothing article 20 may include any variety of forms, including it a shirt, belt, pants, gloves, watch, wristband, etc. In the preferred illustrated embodiment, the clothing article 20 includes an article of head gear such as a hat, visor, helmet, head band, etc. Preferably, of course, the clothing article 20 will be structured to be comfortable and convenient to utilize and wear while performing the activity for which training is desired in an non-obtrusive manner, and possibly inconspicuous manner.

Further included within the activity training device 10 of the present invention is an input assembly, generally 30. The input assembly 30 is preferably disposed in association with the clothing article 20, and in the illustrated embodiment, the input assembly 30 is directly integrated into the clothing article 20 and is secured thereto in a conveniently accessible location. For example, in the illustrated embodiment, the input assembly 30 is accessible via a brim 25 of the article of clothing 20. Of course, it is recognized that the input assembly 30 may be disposed anywhere on the article of clothing and/or an associated article. For example, the input assembly 30 may include a receiver on the article of clothing with a portion remotely but communicatively disposed relative to the remainder of the input assembly 30.

Figures 2, 3:
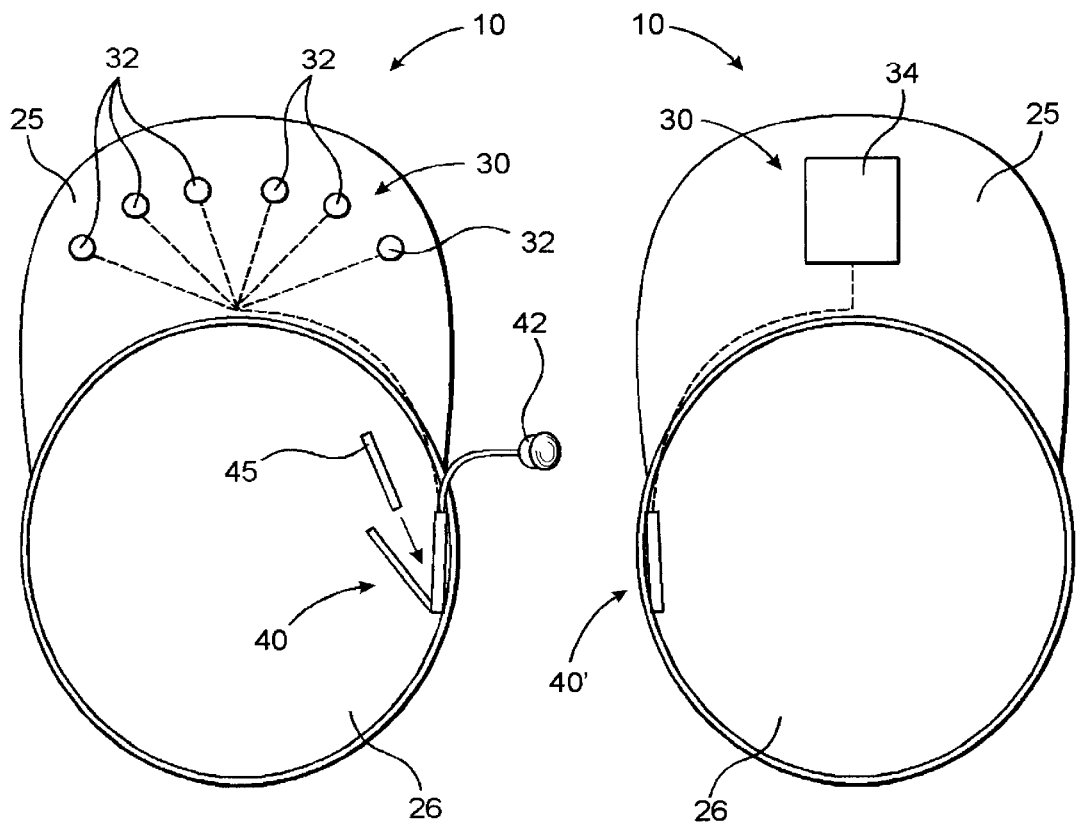
FIG. 2 is a bottom schematic illustration of one embodiment of the activity training device.
FIG. 3 is a bottom schematic illustration of another embodiment of the activity training device.

In the illustrated embodiment, the input assembly 30 preferably includes at least one, but often a plurality of actuatable elements. For example, in the embodiment of FIG. 2, a plurality of actuatable elements in the form of a series of buttons 32 structured to be depressed by a user may at least partially define the input assembly 30. Conversely, in FIG. 3 a single actuatable assembly in the form of a touch pad or touch screen type device 34 wherein the desired degree of selectability is provided via the touch screen 34, and perhaps menu options, so as to give the user a plurality of input options. Of course, it is understood, that a variety of other input assemblies, including voice recognition input assemblies, remotely actuated input assemblies, switches, touch pads, etc. may also be effectively incorporated to define the input assembly 30 so as long as it is responsive to user selectivity. In this regard, the input assembly 30 is structured to provide a user with at least two, but preferably a plurality of response options. Moreover, the response options available to the user via the input assembly 30 are preferably associated with various different aspects of the activity for which training is desired. Looking to one embodiment wherein golf training is provided by the activity training device 10, each of the response options available via the input assembly 30 may deal with different aspects of game play, including one or more response options associated with play on the greens, play in the sand, play in the rough, play in the fairway, or play from the tee. Alternatively, the response options may deal with more finite aspects such as attempting to draw the ball, attempting to perfect the swing, attempting to perfect a follow through, the grip of a club, a player stance, etc. As such, utilizing the present invention, the user is able to specifically identify a particular aspect of the game with which they need assistance at a particular point in time, and utilizing the input assembly 30 is able to effectively select a response option that appropriately corresponds that aspect of the game.

The activity training device 10 further includes an output assembly, generally 40. The output assembly 40 is also preferably associated with the clothing article 20, and may also be directly secured thereto, such as in the illustrated embodiment wherein the output assembly 40 may be secured to a main body 26 of a hat. Of course, as with the input assembly 30 it is understood that output assembly 40 may be provided as an add on device structured to be secured to a conventional clothing article, and indeed may be disposed remotely from the input assembly 30, such as on different portions of the clothing article and/or different clothing articles.

The output assembly 40 is structured to communicate instructional information to the user. The instructional information may be in a variety of different formats, such as including a video format, a text format, etc., however, in the preferred, illustrated embodiment, the instructional information is provided in the form of an audio message and/or audio training tip to the user. Along these lines, the output assembly 40 preferably includes a speaker assembly which is structured to effectively communicate the instructional information to the user. By way of example, in the embodiment of FIG. 2, a small speaker head 42 may be associated with the output assembly 40 and structured to be introduced into the user's ear and/or be disposed in a close proximity to the user's ear. Alternatively, as in the embodiment to FIG. 3, the output assembly 40' may include the speaker assembly as part thereof, with its general proximity to the user's ear being sufficient to provide for effective communication of the instruction information to the user. Of course, various controls such as volume, language, etc. may be provided in association with the output assembly 40 as needed so as to more effectively communicate the instructional information to the user.

The instructional information, as conveyed by the output assembly 40, is preferably selected in response to the response option selected by the user via the input assembly 30. As such, the user is able to dictate a specific aspect of the activity for which they need assistance based upon the selection of a response option, and the output assembly 40 correspondingly provides the user with instructional information that is appropriate for that aspect of the activity. Again looking to the example of a golf training device, if a player is at the tee, they may select a response option associated with tee shots and will thereafter be provided with instructional information to aide in effectively completing the tee shot. Along these lines, in one embodiment it may be preferred that plurality of different items of instructional information be associated with each specific response option, especially considering each aspect of an activity may have various important teaching points associated therewith and it may not be practical to have a response option in connection with each such point. As such, each time a user effectively selects a particular response option utilizing the input assembly 30, the same instructional information need not always be provided to them. Rather, a random and/or patterned communication of different types of instructional information all associated with the same response option may be provided Also in the preferred embodiment, the instructional information will preferably be in the form of a message and/or tip and/or sound which is communicated to the user. In one embodiment the instructional information is spoken by a recognizable personality that is associated with the activity being trained. For example, when the activity is golf, a recognizable professional golfer or celebrity may communicate pre-recorded instructional information having to do with each of the various aspects of the game, thereby providing a degree of credibility and entertainment value in connection with the providing of the instructional information. Alternately, other instructional sounds, such a metronome to help time a swing may also be provided as the audio message. As such, the instructional information may be short, long, or on going as needed.

Also in the illustrated embodiments, wherein the instructional information is in the form of an audio message, a variety of different ones of the instructional information will preferably be stored on or in association with the output assembly 40. This storage can be achieved in a variety of different formats on a variety of different information storage mediums, such as a chip, digital, magnetic or other storage medium, etc. Furthermore, so as to provide a degree of variety and adaptability of the activity training device 10, however, the storage medium 45 associated with the output assembly 40 is preferably removable. In this regard, once a user has become familiar with the instructional information provided in one specific storage medium 45, they may interchange that storage medium 45 with a variety of different storage mediums, either providing different instructional information associated with the same type of activity and/or providing instructional information associated with an entirely different activity. As such, the same activity training device 10 can be effectively utilized for a variety of different activities, while still providing quality and significant instructional information to the user.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An activity training device comprising:
   a) a clothing article comprising head gear structured to be worn by a user;
   b) an input assembly disposed in association with said clothing article;
   c) said input assembly being responsive to a user and structured to provide a user with at least two response options;
   d) an output assembly disposed in association with said clothing article;
   e) said response options provided by said input assembly being associated with different aspects of an activity; and
   f) said output assembly structured to communicate to the user instructional information corresponding said aspect of the activity associated with a selected one of said response options.

2. An activity training device as recited in claim 1 wherein said input assembly includes a plurality of actuatable elements, each corresponding to a different one of said response options and structured to be actuated by the user so as to select said selected one of said response options.

3. An activity training device as recited in claim 2 wherein said actuatable elements comprise buttons.

4. An activity training device as recited in claim 3 wherein said head gear includes a brim, said buttons being disposed on an underside of said brim.

5. An activity training device as recited in claim 1 wherein said clothing article comprises a hat.

6. An activity training device as recited in claim 5 wherein said input assembly is at least partially disposed on an underside of a brim of said hat so as to facilitate selection by the user.

7. An activity training device as recited in claim 1 wherein said instructional information includes golf tips.

8. An activity training device as recited in claim 1 including a plurality of different ones of said instructional information corresponding each of said aspects of the activity associated with said response options.

9. An activity training device as recited in claim 8 wherein said output assembly is structured to randomly communicate said different ones of said instructional information to the user in response to the user selection of said response option.

10. A golf training device comprising:
    a) a clothing article structured to be worn by a user;
    b) an input assembly;
    c) said input assembly being responsive to a user and structured to provide a user with at least two response options which may be selected by the user;
    d) an output assembly disposed in association with said clothing article;
    e) said response options provided by said input assembly being associated with different aspects of an activity;
    f) said output assembly structured to communicate to the user instructional information in the form of an audio message that corresponds said aspect of the activity associated with a selected one of said response options; and
    g) said instructional information structured to be spoken by a recognizable personality.

11. An activity training device as recited in claim 10 wherein said clothing article is structured to be worn on a users head.

12. An activity training device as recited in claim 11 wherein said input assembly is at least partially disposed on an underside of a brim of a hat so as to facilitate selection by the user.

13. An activity training device comprising:
    a) a clothing article structured to be worn by a user;
    b) an input assembly disposed in association with said clothing article;
    c) said input assembly being responsive to a user and structured to provide a user with at least two response options;
    d) an output assembly disposed in association with said clothing article;
    e) said response options provided by said input assembly being associated with different aspects of an activity;
    f) said output assembly structured to communicate to the user instructional information corresponding said aspect of the activity associated with a selected one of said response options; and
    g) said output assembly comprising a speaker structured to deliver said instructional information in an audio format, said instructional information being spoken by a recognizable personality associated with the activity.

14. An activity training device as recited in claim 13 wherein said speaker is structured to be disposed in close proximity to the user's ear.

15. An activity training device comprising:
    a) a clothing article structured to be worn by a user;
    b) an input assembly disposed in association with said clothing article;
    c) said input assembly being responsive to a user and structured to provide a user with at least two response options;
    d) an output assembly disposed in association with said clothing article;
    e) said response options provided by said input assembly being associated with different aspects of an activity;
    f) said output assembly structured to communicate to the user instructional information corresponding said aspect of the activity associated with a selected one of said response options; and
    g) said output assembly including a removable storage medium structured to store said instructional information for communication to the user.

* * * * *